(12) United States Patent
Ku et al.

(10) Patent No.: US 8,520,536 B2
(45) Date of Patent: Aug. 27, 2013

(54) APPARATUS AND METHOD FOR RECOVERING VOICE PACKET

(75) Inventors: Jung-Woo Ku, Seoul (KR); Austin Kim, Seongnam-si (KR); Ho-Chong Park, Seoul (KR); Jae-Bum Kim, Seoul (KR); Chul-Yong Ahn, Suwon-si (KR); Pavel Martynovich, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 476 days.

(21) Appl. No.: 11/790,368

(22) Filed: Apr. 25, 2007

(65) Prior Publication Data
US 2007/0258385 A1    Nov. 8, 2007

(30) Foreign Application Priority Data
Apr. 25, 2006  (KR) .................. 10-2006-0037247

(51) Int. Cl.
*H04L 12/26* (2006.01)
(52) U.S. Cl.
USPC .................................... 370/252; 704/207
(58) Field of Classification Search
None
See application file for complete search history.

(56) References Cited

U.S. PATENT DOCUMENTS

| | | | | |
|---|---|---|---|---|
| 3,952,164 | A | * | 4/1976 | David et al. ............ 704/205 |
| 4,541,111 | A | * | 9/1985 | Takashima et al. ......... 704/269 |
| 4,797,926 | A | * | 1/1989 | Bronson et al. ........... 704/214 |
| 4,912,764 | A | * | 3/1990 | Hartwell et al. ........... 704/261 |
| 5,073,940 | A | * | 12/1991 | Zinser et al. ............ 704/226 |
| 5,142,582 | A | * | 8/1992 | Asakawa et al. ........... 704/228 |
| 5,224,061 | A | * | 6/1993 | Veldhuis .............. 708/300 |
| 5,414,796 | A | * | 5/1995 | Jacobs et al. ............ 704/221 |
| 5,450,449 | A | * | 9/1995 | Kroon ................ 375/350 |
| 5,623,575 | A | * | 4/1997 | Fette et al. ............ 704/265 |
| 5,657,420 | A | * | 8/1997 | Jacobs et al. ............ 704/223 |
| 5,732,389 | A | * | 3/1998 | Kroon et al. ............ 704/223 |
| 5,734,789 | A | * | 3/1998 | Swaminathan et al. ...... 704/206 |
| 5,765,127 | A | * | 6/1998 | Nishiguchi et al. .......... 704/208 |
| 5,787,387 | A | * | 7/1998 | Aguilar .............. 704/208 |
| 5,835,480 | A | * | 11/1998 | Chennakeshu ............ 370/206 |
| 5,897,615 | A | * | 4/1999 | Harada ............... 704/214 |

(Continued)

FOREIGN PATENT DOCUMENTS

| | | |
|---|---|---|
| KR | 10-2005-0066477 A | 6/2005 |
| KR | 10-2006-0002569 A | 1/2006 |

OTHER PUBLICATIONS

Translation of Korean Published Patent Application, KR 10-2006-0002569 A, published on Jan. 9, 2006, Do Hoon Lee.*

(Continued)

*Primary Examiner* — Bunjob Jaroenchonwanit
(74) *Attorney, Agent, or Firm* — Roylance, Abrams, Berdo and Goodman, LLP (57) ABSTRACT

An apparatus and method for recovering lost voice packets are provided, in which a packet loss detector determines whether a received packet has been lost, packet information storage stores voice information of previous voice packets and voice information of the received voice packet, a packet error corrector measures the voice information of the received voice packet, stores the measured voice information in the packet information storage, corrects the voice information when necessary, and generates a corrected voice packet, if the received voice packet is normal, and a packet loss recoverer recovers the voice information of the received voice packet using the voice information of previous voice packets stored in the packet information storage and generates a recovered voice packet, if the received voice packet has been lost.

31 Claims, 11 Drawing Sheets

(56) References Cited

U.S. PATENT DOCUMENTS

| | | | |
|---|---|---|---|
| 5,995,923 A * | 11/1999 | Mermelstein et al. | 704/219 |
| 6,028,890 A * | 2/2000 | Salami et al. | 375/216 |
| 6,101,463 A * | 8/2000 | Lee et al. | 704/207 |
| 6,104,726 A * | 8/2000 | Yip et al. | 370/468 |
| 6,233,552 B1 * | 5/2001 | Mustapha et al. | 704/209 |
| 6,252,952 B1 * | 6/2001 | Kung et al. | 379/114.1 |
| 6,256,609 B1 * | 7/2001 | Byrnes et al. | 704/246 |
| 6,377,914 B1 * | 4/2002 | Yeldener | 704/205 |
| 6,385,578 B1 * | 5/2002 | Lee et al. | 704/225 |
| 6,415,252 B1 * | 7/2002 | Peng et al. | 704/208 |
| 6,418,407 B1 * | 7/2002 | Huang et al. | 704/207 |
| 6,526,376 B1 * | 2/2003 | Villette et al. | 704/207 |
| 6,587,816 B1 * | 7/2003 | Chazan et al. | 704/207 |
| 6,636,829 B1 * | 10/2003 | Benyassine et al. | 704/201 |
| 6,714,907 B2 * | 3/2004 | Gao | 704/220 |
| 6,728,669 B1 * | 4/2004 | Benno | 704/219 |
| 6,775,649 B1 * | 8/2004 | DeMartin | 704/201 |
| 6,810,377 B1 * | 10/2004 | Ho et al. | 704/208 |
| 6,882,711 B1 * | 4/2005 | Nicol | 379/93.33 |
| 6,952,668 B1 * | 10/2005 | Kapilow | 704/206 |
| 6,968,309 B1 * | 11/2005 | Makinen et al. | 704/219 |
| 6,981,193 B2 * | 12/2005 | Park | 714/747 |
| 7,092,881 B1 * | 8/2006 | Aguilar et al. | 704/233 |
| 7,280,960 B2 * | 10/2007 | Wang et al. | 704/219 |
| 7,457,746 B2 * | 11/2008 | Gao | 704/219 |
| 7,519,535 B2 * | 4/2009 | Spindola | 704/266 |
| 7,539,615 B2 * | 5/2009 | Koistinen et al. | 704/226 |
| 7,864,814 B2 * | 1/2011 | Johansson et al. | 370/508 |
| 8,351,341 B1 * | 1/2013 | Callon | 370/252 |
| 2001/0008995 A1 * | 7/2001 | Kim et al. | 704/223 |
| 2001/0021906 A1 * | 9/2001 | Chihara | 704/258 |
| 2001/0044718 A1 * | 11/2001 | Cox et al. | 704/236 |
| 2002/0062209 A1 * | 5/2002 | Choi | 704/208 |
| 2002/0123887 A1 * | 9/2002 | Unno | 704/220 |
| 2003/0097260 A1 * | 5/2003 | Griffin et al. | 704/230 |
| 2003/0101049 A1 * | 5/2003 | Lakaniemi et al. | 704/214 |
| 2003/0135374 A1 * | 7/2003 | Hardwick | 704/264 |
| 2004/0044487 A1 * | 3/2004 | Jung | 702/75 |
| 2004/0073692 A1 * | 4/2004 | Gentle et al. | 709/231 |
| 2004/0181405 A1 * | 9/2004 | Shlomot et al. | 704/241 |
| 2004/0184443 A1 * | 9/2004 | Lee et al. | 370/352 |
| 2004/0192259 A1 * | 9/2004 | Xie | 455/412.1 |
| 2004/0260542 A1 * | 12/2004 | Ananthapadmanabhan et al. | 704/219 |
| 2005/0010401 A1 * | 1/2005 | Sung et al. | 704/219 |
| 2005/0049853 A1 * | 3/2005 | Lee et al. | 704/201 |
| 2005/0143987 A1 * | 6/2005 | Cox et al. | 704/223 |
| 2005/0154584 A1 * | 7/2005 | Jelinek et al. | 704/219 |
| 2005/0228651 A1 * | 10/2005 | Wang et al. | 704/207 |
| 2005/0259681 A1 * | 11/2005 | Lai | 370/466 |
| 2005/0261897 A1 * | 11/2005 | Jelinek | 704/219 |
| 2006/0074643 A1 * | 4/2006 | Lee et al. | 704/222 |
| 2006/0206318 A1 * | 9/2006 | Kapoor et al. | 704/221 |
| 2006/0209955 A1 * | 9/2006 | Florencio et al. | 375/240.12 |
| 2006/0271354 A1 * | 11/2006 | Sun et al. | 704/205 |
| 2006/0271359 A1 * | 11/2006 | Khalil et al. | 704/226 |
| 2006/0271373 A1 * | 11/2006 | Khalil et al. | 704/500 |
| 2007/0025538 A1 * | 2/2007 | Jarske et al. | 379/202.01 |
| 2007/0061137 A1 * | 3/2007 | Yang et al. | 704/222 |
| 2007/0174047 A1 * | 7/2007 | Anderson et al. | 704/207 |
| 2008/0086302 A1 * | 4/2008 | Krishnan et al. | 704/225 |
| 2008/0151769 A1 * | 6/2008 | El-Hennawey et al. | 370/252 |
| 2008/0189101 A1 * | 8/2008 | Jabri et al. | 704/219 |
| 2008/0189102 A1 * | 8/2008 | Takada | 704/225 |
| 2008/0312917 A1 * | 12/2008 | Ananthapadmanabhan et al. | 704/230 |
| 2009/0043569 A1 * | 2/2009 | Gao | 704/207 |
| 2009/0240490 A1 * | 9/2009 | Kim et al. | 704/207 |
| 2011/0022924 A1 * | 1/2011 | Malenovsky et al. | 714/752 |

OTHER PUBLICATIONS

Variable Rate Multimodal Speech coder with Gain Matched Analysis by Synthesis, by Erdal Paksoy, 1997.*

ITU-T Standard, G728 Annex J, released Sep. 1999.*

3GPP2-WG of Association of Radio Industries and Businesses (ARIB), "ARIB STD-T64-C.S0014-0 v1.0, Enhanced Variable Rate Codec (EVRC), Speech Service Option 3 for Wideband Spread Spectrum Digital Systems", 1997, pp. 1-141, 3rd Generation Partnership Project 2.

* cited by examiner

APPARATUS AND METHOD FOR RECOVERING VOICE PACKET

CROSS-REFERENCE TO RELATED APPLICATION

This application claims the benefit under 35 U.S.C. §119(a) of Korean Patent Application No. 10-2006-0037247, filed in the Korean Intellectual Property Office on Apr. 25, 2006, the entire disclosure of which is incorporated herein by reference.

BACKGROUND OF THE INVENTION

1. Field of the Invention

The present invention relates generally to an apparatus and method for recovering (concealing the loss of) voice packets. More particularly, the present invention relates to an apparatus and method for determining whether a voice packet received at a relay is lost and if the voice packet is lost, recovering (concealing the loss of) the voice packet before relaying the voice packet to a receiver.

2. Description of the Related Art

Voice over Internet Protocol (VoIP) is Internet telephony that sends voice packets over a packet network designed for data communications. VoIP is a communication technology that enables a call to be performed as in a regular phone by converting voice data into IP packets.

In a VoIP communication network, a transmitter converts a voice Pulse Coded Modulation (PCM) signal into compressed voice parameter information using a voice encoder constructed based on a human voice generation model and stores the voice parameter information in packets, prior to transmission to a receiver. The receiver extracts the voice parameter information from the voice packets and reproduces the PCM signal using the extracted information. Since packet transmission is carried out asynchronously in the VoIP communication network, the voice packets do not arrive at the receiver in a consistent manner. If a large number of packets arrive around a particular time, they may be lost. Also, in a mobile communication environment, a bad channel status can lead to packet loss.

Accordingly, recovering of lost packets is a necessary task to be performed by the receiver. Generally, Packet Loss Concealment (PLC) is used to recover the lost packets. Existing PLC techniques basically use the voice information of adjacent normal packets. If only voice information of a previous normal packet is used, a lost packet can be recovered to a certain extent without adding to a packet transmission delay. However, the use of the voice information of both previous and following packets more effectively recovers the lost packet. Unfortunately, the packet transmission delay increases with the number of following packets used to recover the lost packet and thus, the number of packets used needs to be controlled according to a packet transmission time and service requirements.

For further illustration, a conventional voice packet communication environment in the case where the transmitter and the receiver use the same type of audio Coder-Decoder (CODEC) will be described in detail below.

Figure 1:
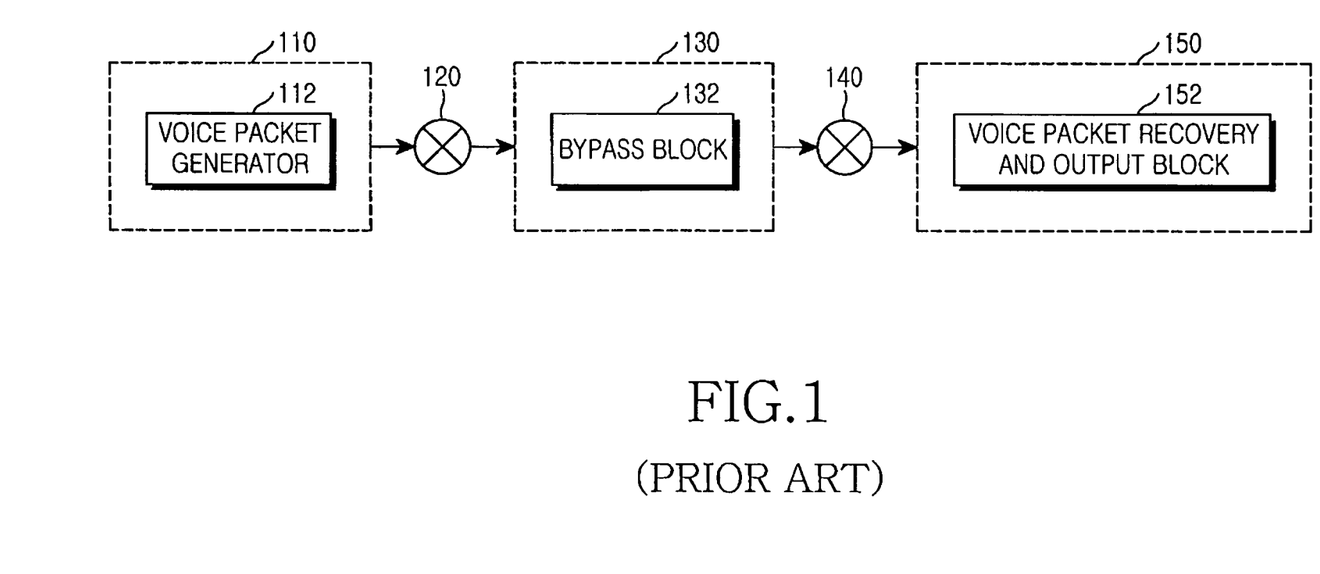
FIG. 1 is a block diagram of a conventional voice packet communication system.

FIG. 1 is a block diagram of a conventional voice packet communication system. Referring to FIG. 1, the voice packet communication system comprises a transmitter 110, a relay 130, and a receiver 150.

The transmitter 110 has a voice packet generator 112 and outputs a voice packet generated from the voice packet generator 112 on a first channel 120. The relay 130, which can be a gateway or a Base Station (BS), outputs the voice packet received from the transmitter 110 on a second channel 140 using a bypass block 132. When the transmitter 110 and the receiver 150 use the same type of audio CODEC, the bypass block 132 outputs the voice packet without any additional processing, to the receiver 150. The receiver 150 recovers the voice packets that may be lost during transmission on the channels 120 and 140, and converts the voice packets to an analog voice signal using a voice packet recovery and output block 152.

As described above, in the case where the transmitter and the receiver use the same kind of audio CODEC and thus, the relay simply bypasses a received voice packet, it is difficult to improve the performance of the packet recovery block in the receiver unless the receiver is a new product, such as a terminal or an IP phone. However, even though voice packet recovery devices and methods have been improved, their features are not applicable to conventional receivers in real implementation. Consequently, users of conventional receivers may not receive services with better voice quality.

Voice packet recovery in the voice packet recovery block 152 has a number of drawbacks, including the following.

First, recovery of a lost voiced packet may be recovered using a previous unvoiced packet. For example, when voiced packets follow an unvoiced packet, that is, when an unvoiced-voiced transient area exists, loss and noise information in the first of the voiced packet is recovered using the previous unvoiced packet.

Second, with the conventional voice packet recovery, when a plurality of packets are contiguously lost, buzz may be output because they are recovered using the voice information of a previous packet.

Third, voice waveforms may become bigger in the process of deriving a lost packet from a previous packet.

Accordingly, a need exists for a system and method for more effectively and efficiently recovering voice packets.

SUMMARY OF THE INVENTION

An object of embodiments of the present invention is to substantially solve at least the above problems and/or disadvantages and provide at least the advantages below. Accordingly, an object of embodiments of the present invention is to provide a voice packet recovery apparatus and method for determining whether a voice packet received at a relay is lost and if the voice packet is lost, recovering the voice packet prior to relaying the voice packet to a receiver.

Another object of embodiments of the present invention is to provide a voice packet recovery apparatus and method for correcting voiced information which has been recovered using unvoiced information of a previous packet.

A further object of embodiments of the present invention is to provide a voice packet recovery apparatus and method for reducing buzz that may be created when a plurality of voice packets are contiguously lost.

Still another object of embodiments of the present invention is to provide a voice packet recovery apparatus and method for restricting voice information with a large waveform that can be created during voice packet recovery.

According to one aspect of embodiments of the present invention, an apparatus for recovering a lost voice packet is provided, in which a packet loss detector determines whether a received packet has been lost, packet information storage stores voice information of previous voice packets and voice information of the received voice packet, a packet error corrector measures the voice information of the received voice packet, stores the measured voice information in the packet information storage, corrects the voice information when necessary, and generates a corrected voice packet, if the received voice packet is normal, and a packet loss recoverer recovers the voice information of the received voice packet using the voice information of previous voice packets stored in the packet information storage and generates a recovered voice packet, if the received voice packet has been lost.

According to another aspect of embodiments of the present invention, a method for recovering a lost voice packet is provided, in which a voice packet is received and it is determined whether the received packet has been lost, and voice information of the received voice packet is recovered using voice information of previous voice packets if the received voice packet has been lost.

BRIEF DESCRIPTION OF THE DRAWINGS

The above and other objects, features and advantages of embodiments of the present invention will become more apparent from the following detailed description when taken in conjunction with the accompanying drawings in which.

Throughout the drawings, like reference numerals will be understood to refer to like parts, components and structures.

DETAILED DESCRIPTION OF EXEMPLARY EMBODIMENTS

Exemplary embodiments of the present invention will be described herein below with reference to the accompanying drawings. Descriptions of well-known functions or constructions are omitted for clarity and conciseness.

Embodiments of the present invention provide an apparatus and method for determining whether a voice packet received at a relay is lost and if the voice packet is lost, recovering the voice packet before relaying the voice packet to a receiver.

Figure 2:
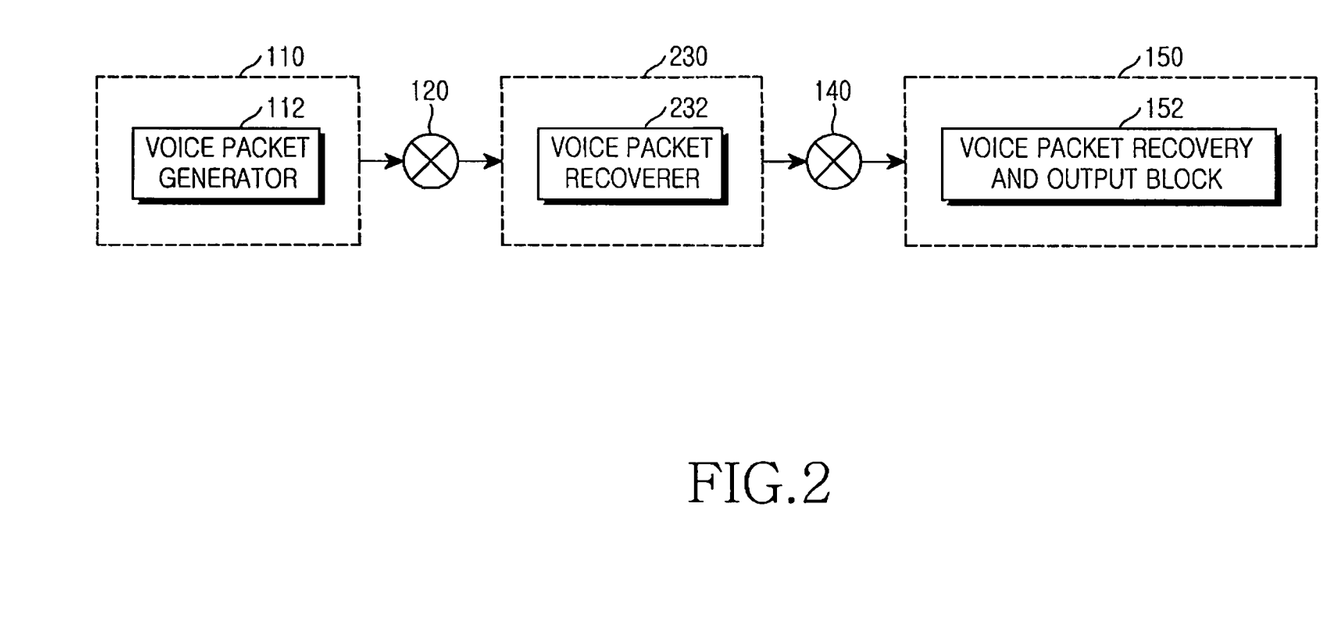
FIG. 2 is a block diagram of a voice packet communication system according to exemplary embodiments of the present invention.

FIG. 2 is a block diagram of a voice packet communication system according to exemplary embodiments of the present invention. Referring to FIG. 2, the voice packet communication system comprises the transmitter 110, a relay 230, and the receiver 150. The transmitter 110 has the voice packet generator 112 and outputs a voice packet generated from the voice packet generator 112 on the first channel 120. The relay 230, which can be a gateway or a BS, recovers loss in the voice packet that may be generated during the transmission on the first channel 120 by a voice packet recoverer 232 and outputs the voice packet on the second channel 140. The receiver 150 recovers the voice packet that may be lost during transmission on the channel 140 and converts the voice packet into an analog voice signal using the voice packet recovery and output block 152.

Figure 3:
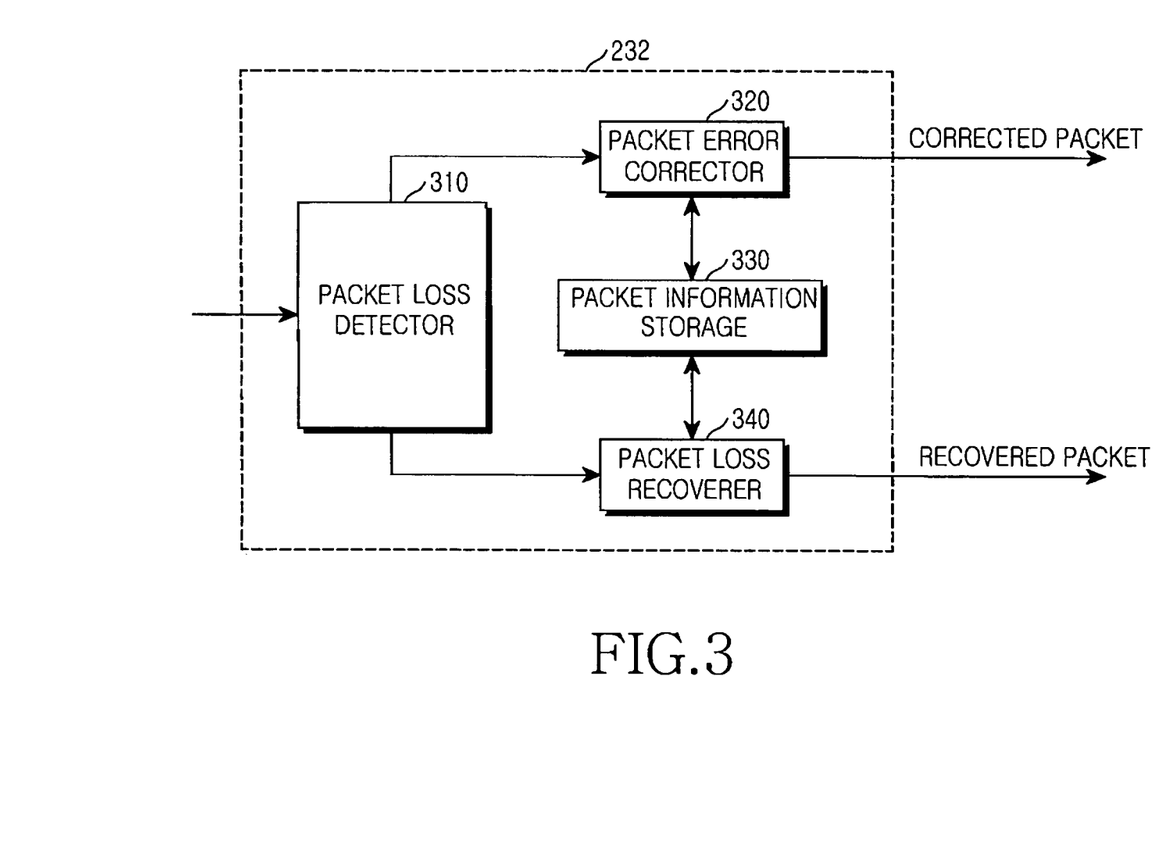
FIG. 3 is a block diagram of a voice packet recoverer in the voice packet communication system according to exemplary embodiments of the present invention.

FIG. 3 is a block diagram of the voice packet recoverer in the voice packet communication system according to an exemplary embodiment of the present invention. Referring to FIG. 3, the voice packet recoverer 232 comprises a packet loss detector 310, a packet error corrector 320, packet information storage 330, and a packet loss recoverer 340.

The packet loss detector 310 determines whether there is any packet loss in a received voice packet (a received voice packet has been lost). The packet loss detector 310 determines there is the packet loss if the packet rate of the received voice packet is not one of predetermined packet rates representing existence of packets in the communication system. If the voice packet is normal, the packet loss detector 310 sends the voice packet to the packet error corrector 320. If there is any packet loss in a received voice packet, the packet loss detector 310 sends the voice packet to the packet loss recoverer 340.

The packet error corrector 320 measures voice information of the voice packet, stores the measurements in the packet information storage 330, corrects the voice information when needed, and outputs the corrected voice packet.

The packet loss recoverer 340 recovers the lost voice packet using voice information of previous voice packets stored in the packet information storage 330.

The packet information storage 330 stores information with which to determine whether correction is required, the data rate of the latest received valid voice packet, and the voice information of voice packets.

Figure 4:
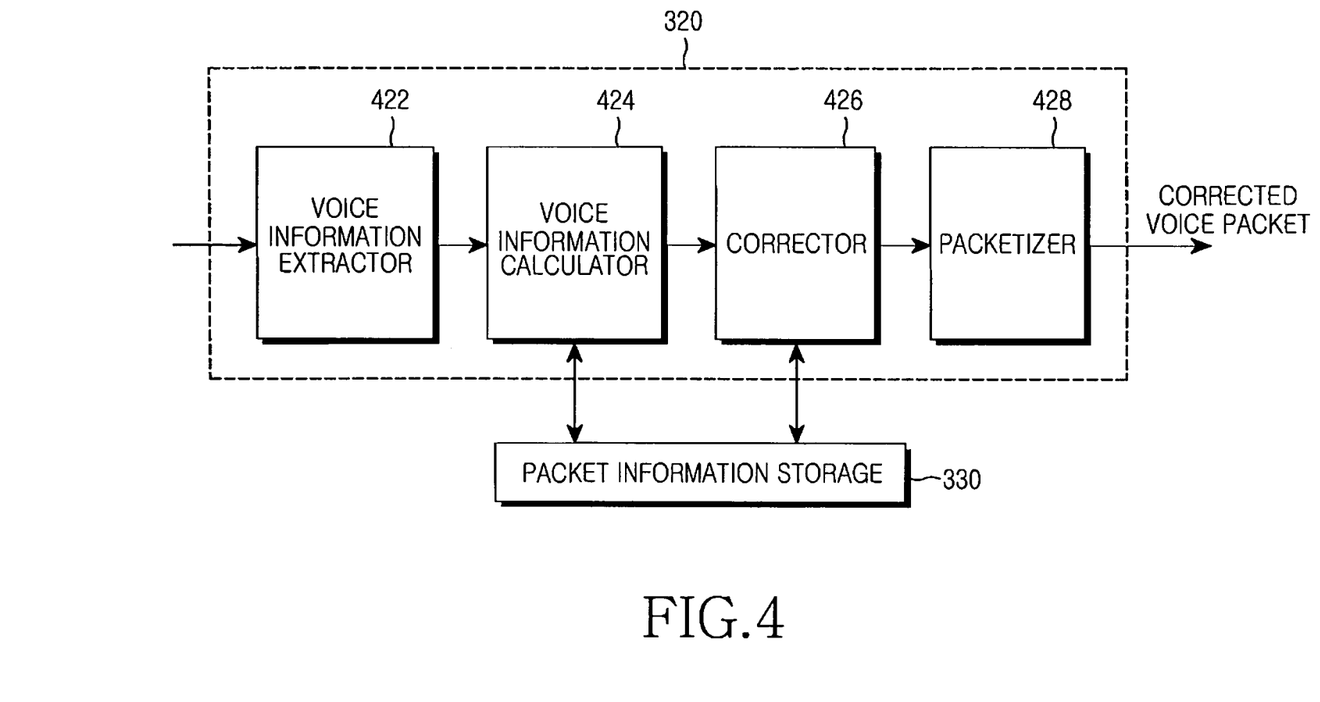
FIG. 4 is a block diagram of a packet error corrector in the voice packet recoverer according to exemplary embodiments of the present invention.

FIG. 4 is a block diagram of the packet error corrector in the voice packet recoverer according to an exemplary embodiment of the present invention. Referring to FIG. 4, the packet error corrector 320 comprises a voice information extractor 422, a voice information calculator 424, a corrector 426, and a packetizer 428.

The voice information extractor 422 measures the data rate of a received voice packet and extracts voice information from the voice packet according to the data rate. If the data rate is equal to or lower than a threshold, the voice information extractor 422 determines that the voice packet is an unvoiced one and calculates a Line Spectrum Pair (LSP) and a gain representing a voice amplitude from the voice packet.

If the data rate is higher than the threshold, the voice information extractor 422 determines that the voice packet is a voiced one which includes unvoiced information and voiced information and calculates an LSP, a pitch, an Adaptive CodeBook (ACB) gain, and a Fixed CodeBook (FCB) gain from the voice packet. The LSP is voiced information indicating the spectral energy of voice. The pitch is the interval between voiced sounds and the ACB gain is the gain of voiced sound. The FCB gain is the gain of unvoiced sound. Additional details of the voice information are described in publication "TIA/EIA/IS-127, Enhanced Variable Rate Codes, Speech Service Option3 For Wideband Spread Spectrum Digital Systems, 1997", the entire disclosure of which is incorporated herein by reference.

The voice information extractor 422 extracts voice information. The extracted voice information is stored in the packet information storage 330. Also, the extracted voice information is transferred to the voice information calculator 424.

The voice information calculator 424 receives the data rate and the voice information from the voice information extractor 422. If the data rate is equal to or less than the threshold, which means that the received voice packet is an unvoiced one, the voice information calculator 424 checks the average LSP and average gain of unvoiced packets among packets up to the previous packet, and calculates the average LSP and the average gain of the previous unvoiced packets and the received packet by using Equation (1) below.

If the data rate is higher than the threshold, which means that the received packet is a voiced one, the voice information calculator 424 calculates the average ACB gain and average FCB gain of the received voice packet by using Equation (2) below. Equation (1) applies to an unvoiced packet, and Equation (2) applies to a voiced packet.

$$LSP_{avg}[i]=(1-\alpha)\cdot LSP_{avg,pre}[i]+\alpha\cdot LSP[i];$$
$$i[0,MAX_{index}-1]GAIN_{avg}=(1-\alpha)\cdot GAIN_{avg,pre}+\alpha\cdot GAIN \quad (1)$$

In the above Equation (1), $LSP_{avg,prev}$ represents the average LSP of the previous unvoiced packets among received packets up to the previous packet, LSP represents the LSP of the received unvoiced packet, $LSP_{avg}$ represents the average LSP of the previous unvoiced packets and the received unvoiced packet, $MAX_{index}$ represents the number of elements in an LSP set, $GAIN_{avg,pre}$ represents the average gain of the previous unvoiced packets, GAIN represents the gain of the received unvoiced packet, $GAIN_{avg}$ represents the average gain of the previous unvoiced packets and the received unvoiced packet, and $\alpha$ is a weight.

$$ACB_{avg} = \frac{1}{subframe\_num}\left(\sum_{i=0}^{subframe\_num-1} ACB[i]\right) \quad (2)$$

$$FCB_{avg} = \frac{1}{subframe\_num}\left(\sum_{i=0}^{subframe\_num-1} FCB[i]\right)$$

In the above Equation (2), ACB[i] represents the ACB gain of an $i^{th}$ subframe in the received voice packet, $ACB_{avg}$ represents the average ACB gain of the subframes of the received packet, and subframe_num represents the number of the subframes of the received voice packet.

Returning to FIG. 4, the voice information calculator 424 stores the data rate, the voice information, and the average voice information of the received voiced packet in the packet information storage 330, while providing them to the corrector 426.

The corrector 426 receives the data rate, the voice information, and the average voice information of the received voice packet and determines whether to correct the voice packet, referring to a correction flag stored in the packet information storage 330. If correction is not required, the corrector 426 initializes the correction flag and outputs them to the packetizer 428. If correction is required, the corrector 426 converts the ACB gain to 0, thereby reducing noise that may be produced, initializes the correction flag of the packet information storage 330, stores the corrected voice information in the packet information storage 330, and outputs it to the packetizer 428.

The corrector 426 determines that correction is required if the data rate is high and the correction flag is set by the packet loss recoverer 340. That is, the corrector 426 compensates for possible noise if a previous recovered packet was recovered using an unvoiced packet and the received packet is a voiced one with a high data rate.

The packetizer 428 then generates a corrected voice packet using the voice information received from the corrector 426.

Figure 5:
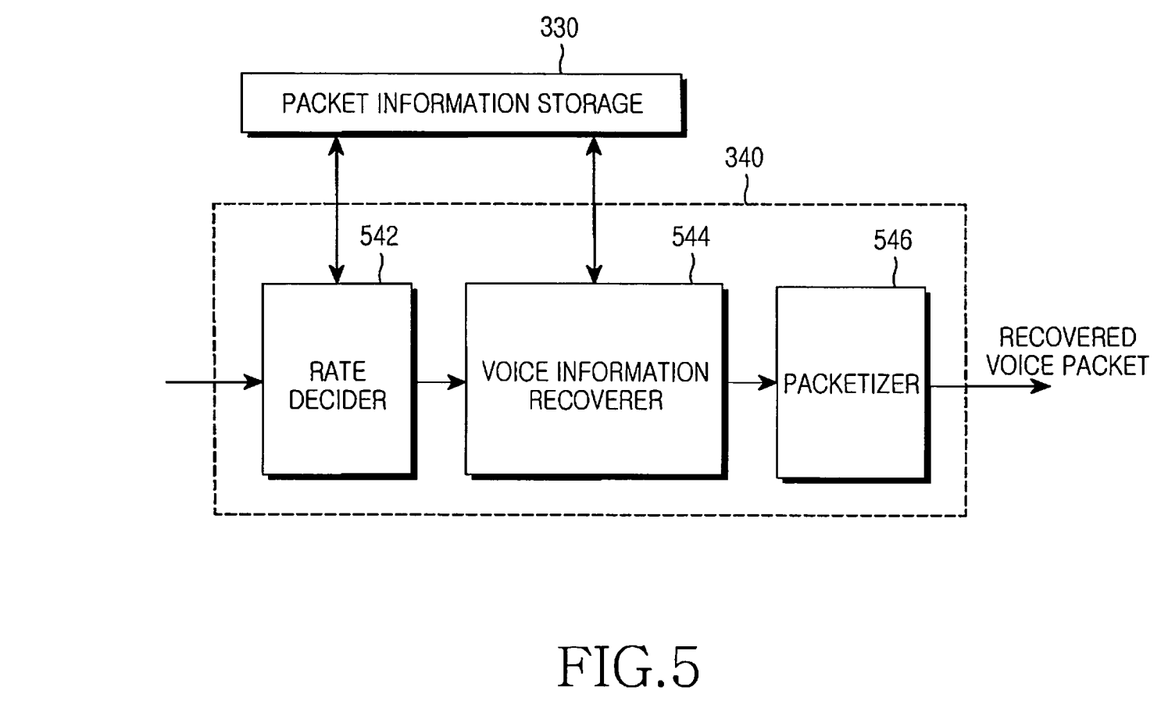
FIG. 5 is a block diagram of a packet loss recoverer in the voice packet recoverer according to exemplary embodiments of the present invention.

FIG. 5 is a block diagram of the packet loss recoverer in the voice packet recoverer according to exemplary embodiments of the present invention. Referring to FIG. 5, the packet loss recoverer 340 comprises a rate decider 542, a voice information recoverer 544, and a packetizer 546.

Upon receipt of a lost voice packet, the rate decider 542 checks the data rate of the latest valid packet stored in the packet information storage 330 and provides the data rate to the voice information recoverer 544. The data rate of the latest valid packet is that of the latest received voice packet which is not damaged among received voice packets.

The voice information recoverer 544 recovers voice information of the received voice packet using voice information stored in the packet information storage 330 according to the data rate of the latest valid packet, stores the recovered voice information in the packet information storage 330, and sends it to the packetizer 546. If the data rate of the latest valid packet is low and thus, the voice information is recovered using unvoiced information stored in the packet information storage 330, the voice information recoverer 544 sets the correction flag in the packet information storage 330.

The packetizer 546 then generates a recovered voice packet using the voice information received from the voice information recoverer 544.

Figure 6:
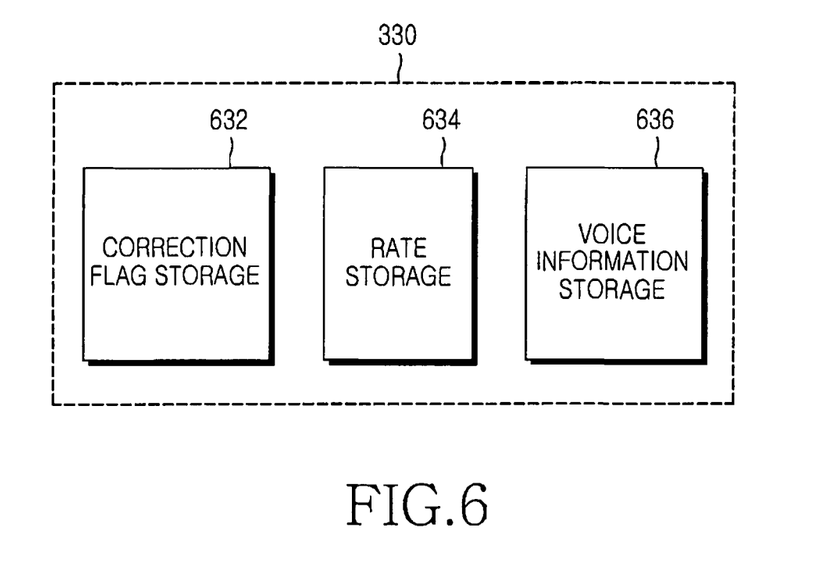
FIG. 6 is a block diagram of packet information storage in the voice packet recoverer according to exemplary embodiments of the present invention.

FIG. 6 is a block diagram of the packet information storage in the voice packet recoverer according to exemplary embodiments of the present invention. Referring to FIG. 6, the packet information storage 330 comprises a correction flag storage 632, a rate storage 634, and a voice information storage 636.

The correction flag storage 632 stores the correction flag. The correction flag is set when the last recovered voice packet was recovered using unvoiced information. The correction flag is set by the packet loss recoverer 340 and initialized by the packet error corrector 320.

The rate storage 634 stores the data rate of the latest valid packet, which is the last of data rates received from the packet error corrector 320 and provides it to the packet loss recoverer 340 upon request from the packet loss recoverer 340.

The voice information storage 636 stores the voice information of normal voice packets and lost voice packets.

Figure 7:
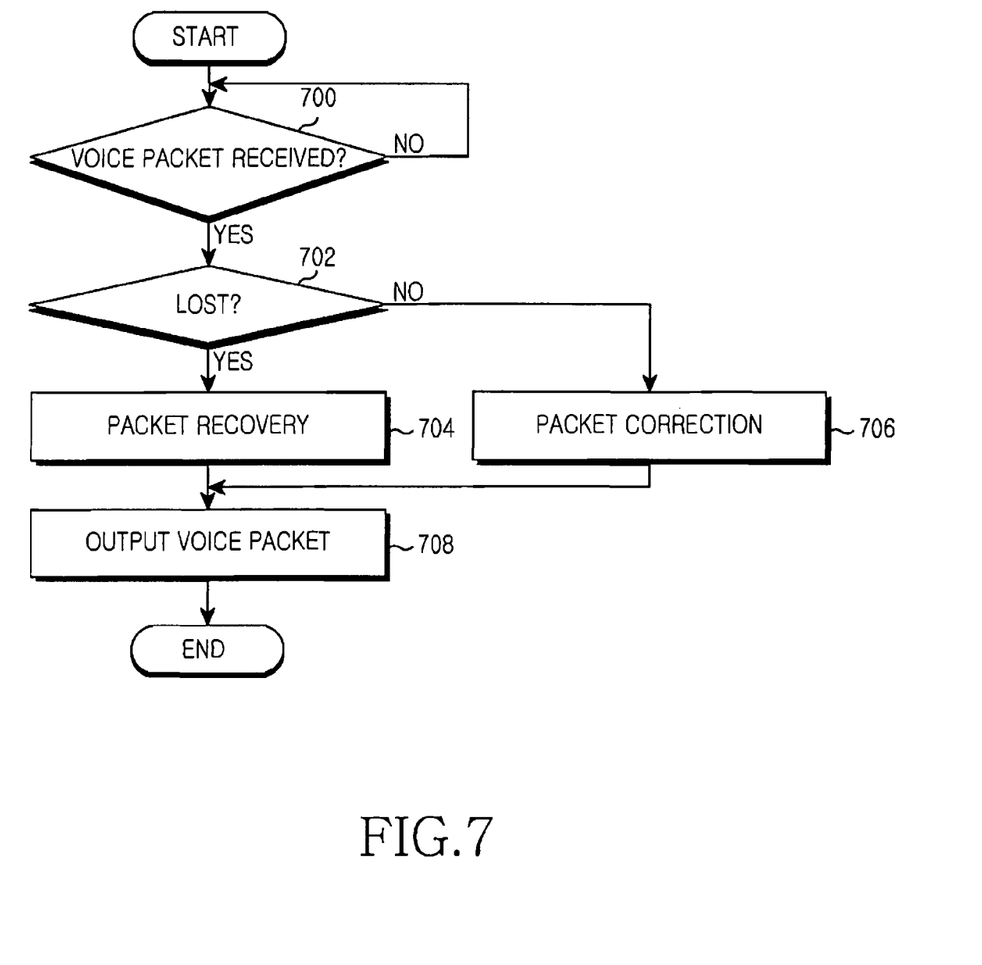
FIG. 7 is a flowchart illustrating an operation for recovering a lost voice packet prior to transmission at a relay in the voice packet communication system according to exemplary embodiments of the present invention.

FIG. 7 is a flowchart illustrating an operation for recovering a lost voice packet prior to transmission at a relay in the voice packet communication system according to exemplary embodiments of the present invention. Referring to FIG. 7, the relay monitors reception of a voice packet in step 700. Upon receipt of a voice packet, the relay determines whether the voice packet has been lost in step 702.

If the voice packet has been lost, the relay recovers the voice packet in step 704 and outputs the recovered voice packet in step 708. The voice packet recovery of step 704 will be described later in great detail below with reference to FIG. 9.

If the voice packet is normal, the relay corrects the voice packet in step 706 and outputs the corrected voice packet in step 708. The voice packet correction of step 706 will be described in great detail below with reference to FIG. 8.

Figure 8:
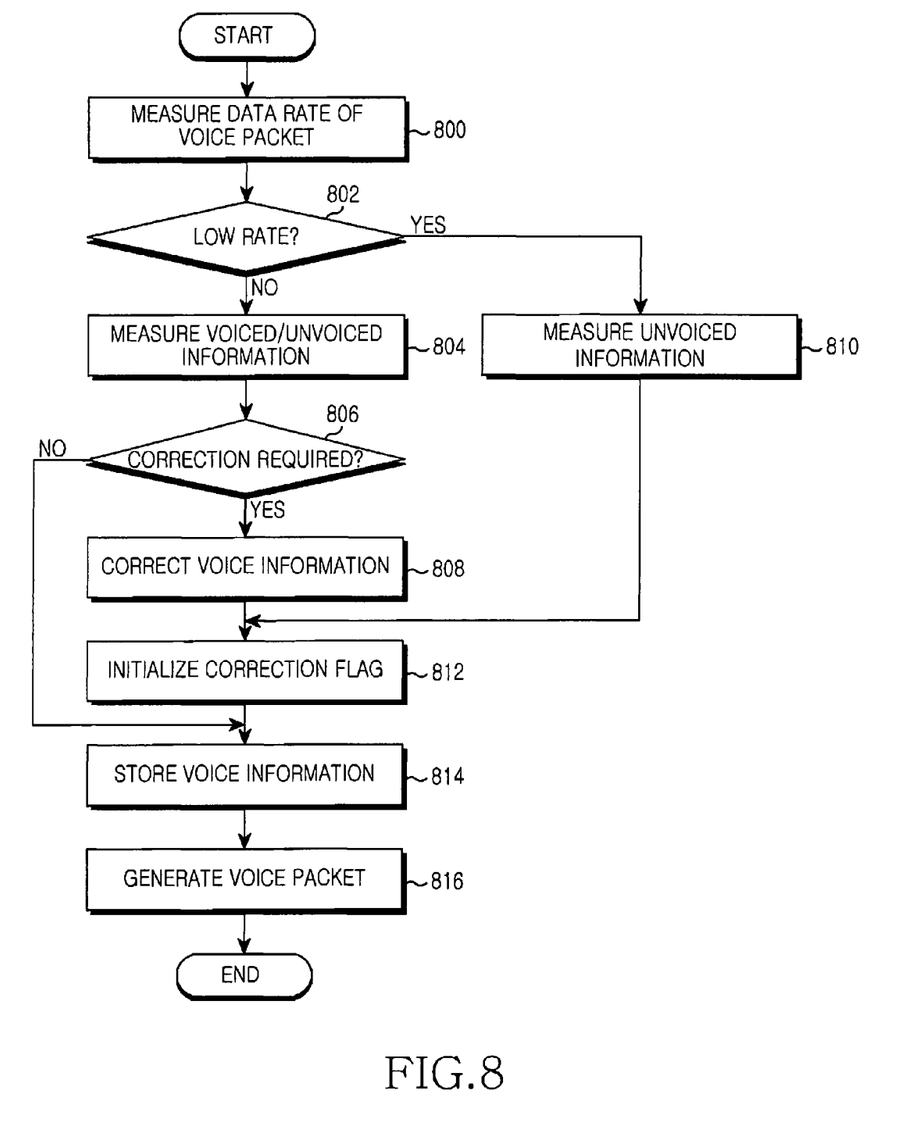
FIG. 8 is a flowchart illustrating an operation of the packet error corrector for correcting a voice packet in the voice packet recoverer according to exemplary embodiments of the present invention.

FIG. 8 is a flowchart illustrating an operation of the packet error corrector for correcting a voice packet in the voice packet recoverer according to exemplary embodiments of the present invention. Referring to FIGS. 3 and 8, when receiving a normal voice packet, the packet error corrector 320 measures the data rate of the voice packet in step 800 and determines whether the data rate is low in step 802.

In case of a low data rate, the packet error corrector 320 measures unvoiced information of the voice packet in step 810 and initializes the correction flag in the packet information storage 330 in step 812. The packet error corrector 320 stores the unvoiced information in the packet information storage 330 in step 814 and generates a voice packet using the unvoiced information in step 816.

In case of a high data rate, the packet error corrector 320 measures unvoiced information and voiced information of the voice packet in step 804 and determines whether voice correction is required according to the correction flag stored in the packet information storage 330 in step 806. If the correction is required, which means that the correction flag is set, the packet error corrector 320 changes the ACB gain of the voice packet to 0, for correcting the voice information of the voice packet in step 808. The packet error corrector 320 initializes the correction flag in step 812, stores the unvoiced information, the voiced information, and the corrected voice information in the packet information storage 330 in step 814, and generates a voice packet using the unvoiced information, the voiced information, and the corrected voice information in step 816.

If the correction is not required in step 806, which means that the correction flag is not set, the packet error corrector 320 stores the unvoiced information and the voiced information in the packet information storage 330 in step 814, and generates a voice packet using the unvoiced information and the voiced information in step 816.

Figure 9:
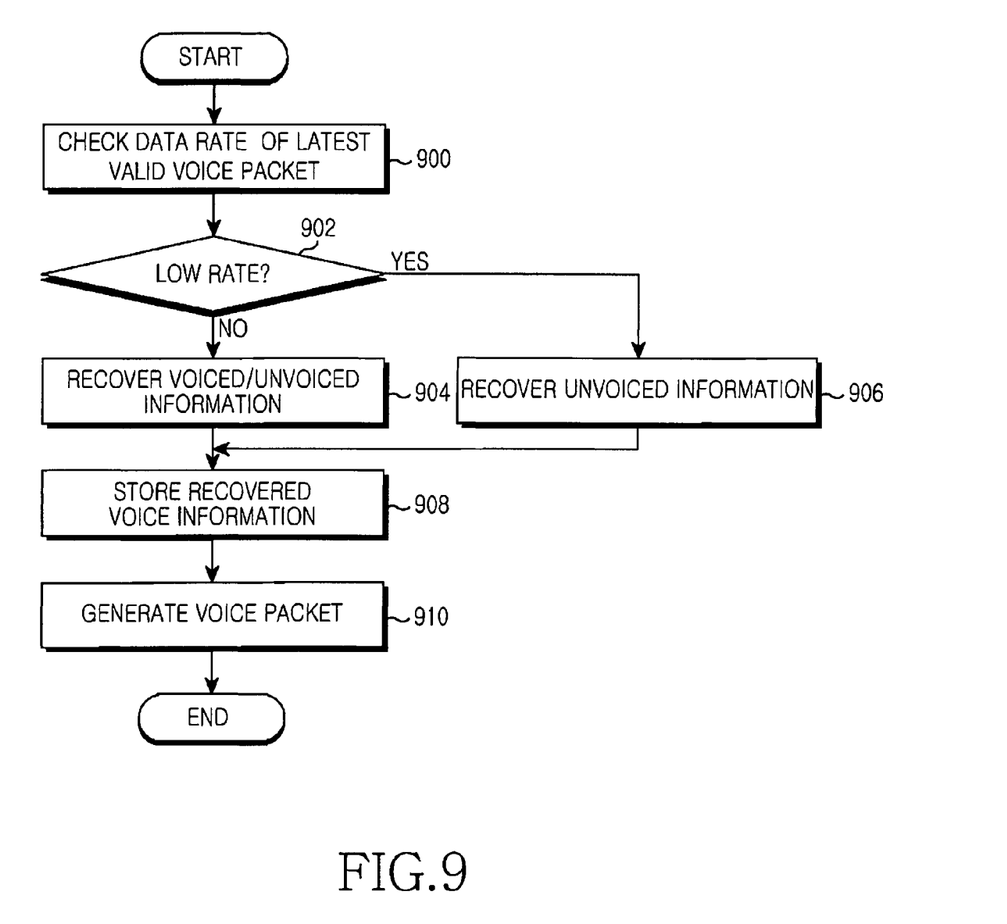
FIG. 9 is a flowchart illustrating an operation of the packet loss recoverer for recovering a lost voice packet in the voice packet recoverer according to exemplary embodiments of the present invention.

FIG. 9 is a flowchart illustrating an operation of the packet loss recoverer for recovering a lost voice packet in the voice packet recoverer according to exemplary embodiments of the present invention. Referring to FIGS. 3 and 9, upon receipt of a lost voice packet, the packet loss recoverer 340 checks the data rate of the latest valid packet in the packet information storage 330 in step 900 and determines whether the data rate is low in step 902.

If the data rate is not low, the packet loss recoverer 340 recovers voiced information and unvoiced information of the voice packet using voice information stored in the packet information storage 330 in step 904 and stores the recovered voice information in the packet information storage 330 in step 908, and generates a voice packet using the recovered voice information in step 910.

If the data rate is low, the packet loss recoverer 340 recovers unvoiced information of the voice packet using voice information stored in the packet information storage 330 in step 906 and stores the recovered voice information in the packet information storage 330 in step 908, and generates a voice packet using the recovered voice information in step 910. The recovery of unvoiced information will be described later in great detail below with reference to FIG. 11.

Figure 10:
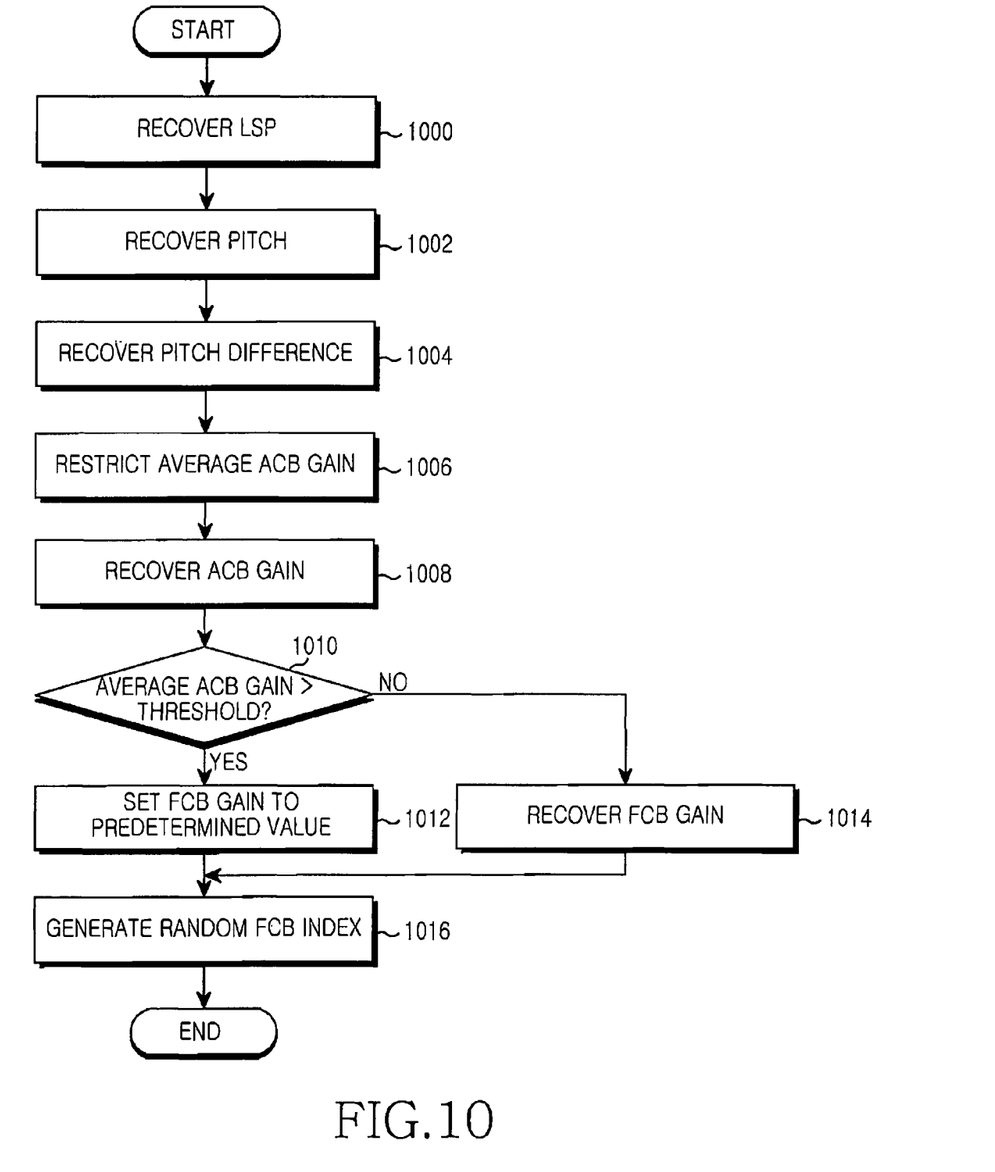
FIG. 10 is a flowchart illustrating an operation of the packet loss recoverer for recovering a packet including unvoiced sound and voiced sound (a voiced packet) in the voice packet recoverer according to exemplary embodiments of the present invention.

FIG. 10 is a flowchart illustrating an operation of the packet loss recoverer for recovering a voiced packet in the voice packet recoverer according to exemplary embodiments of the present invention. Referring to FIGS. 3, 5 and 10, if the data rate of the latest valid packet is not low, the voice information recoverer 544 of the packet loss recoverer 340 recovers the LSP of a received voice packet with the LSP of a previous voice packet stored in the packet information storage 330 in step 1000 and recovers the pitch of the received voice packet according to the number of contiguous lost received packets and the pitch of the previous packet stored in the packet information storage 330 in step 1002. If the number of contiguous lost packets is less than a value, for example 2 or less, the pitch of the previous voice packet is increased or decreased by a value, for example 1. In this case if the number of contiguous lost packets is 3 or larger, the pitch of the previous voice packet is increased by 1.

After the pitch recovery, the voice information recoverer 544 calculates a pitch difference by subtracting the pitch of the previous voice packet from the recovered pitch in step 1004.

The voice information recoverer 544 checks the average ACB gain of the previous packet stored in the packet information storage 330 and if the average ACB gain is larger than an ACB gain limit, changes the average ACB gain to the ACB gain limit in step 1006. The ACB gain restriction is for preventing a sudden increase in voice waveform during the voice packet recovery.

In step 1008, the voice information recoverer 544 recovers the ACB gain of the received voice packet to be equal to the average ACB gain. If a voice packet does not have a low data rate, it includes both voiced information and unvoiced information, and one packet is comprised of three subframes each having voiced information. Therefore, the voice information recoverer 544 recovers the ACB gain of each subframe to be equal to the average ACB gain in step 1008.

The voice information recoverer 544 compares the average ACB gain with an ACB gain threshold in step 1010. If the average ACB gain is larger than the ACB gain threshold, the voice information recoverer 544 sets the FCB gain of the received voice packet to a predetermined value in step 1012 and randomly sets an FCB index in step 1016. The predetermined value is an empirically obtained small value or 0. If the average ACB gain of the previous voice packet is larger than the ACB gain threshold, this means that it is highly probable that the received voice packet is a voiced packet. Therefore, the effects of unvoiced sound are reduced by setting the FCB gain representing the amplitude of the unvoiced sound to the predetermined small value in step 1012.

If the average ACB gain is equal to or less than the ACB gain threshold, the voice information recoverer 544 recovers the FCB gain of the received voice packet to be equal to the FCB gain of the previous packet in step 1014 and randomly sets the FCB index of the received voice packet in step 1016. Since the FCB index is not related to the previous voice packet, it is randomly generated.

Figure 11:
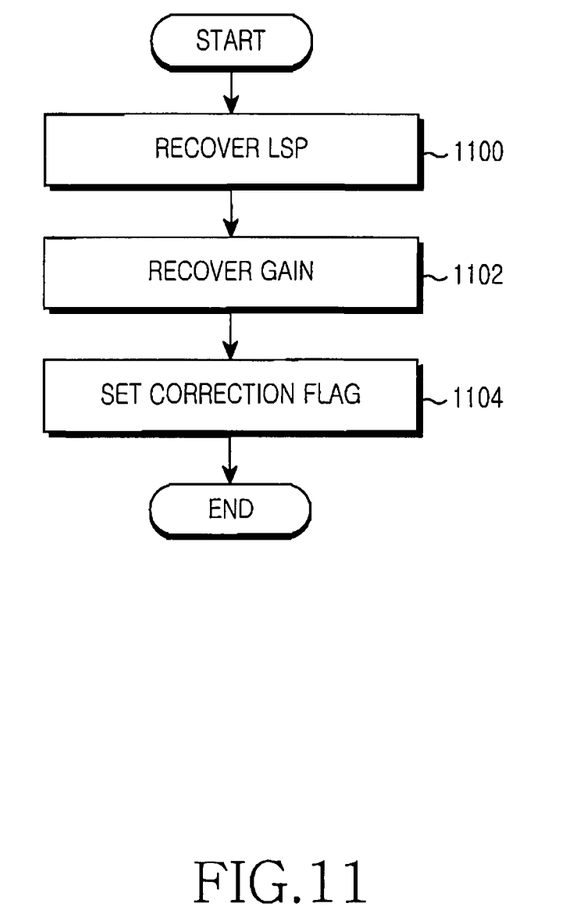
FIG. 11 is a flowchart illustrating an operation of the packet loss recoverer for recovering a packet including unvoiced sound only (an unvoiced packet) in the voice packet recoverer according to exemplary embodiments of the present invention.

FIG. 11 is a flowchart illustrating an operation of the packet loss recoverer for recovering an unvoiced packet in the voice packet recoverer according to exemplary embodiments of the present invention. Referring to FIGS. 3, 5 and 11, if the data rate of the latest valid packet is low, the voice information recoverer 544 of the packet loss recoverer 340 recovers the LSP of the received voice packet using the average LSP of previous unvoiced packets stored in the packet information storage 330 in step 1100, and recovers the gain of the received voice packet using the gains of previous packets stored in the packet information storage 330 by using Equation (3) below in step 1102.

$$\text{GAIN}=(1-\beta)\cdot\text{GAIN}_{prev}+\beta\cdot\text{GAIN}_{avg} \quad (3)$$

In the above Equation (3), GAIN represents the recovered gain of the received unvoiced packet, $\text{GAIN}_{prev}$ represents the gain of the latest unvoiced packet, $GAIN_{avg}$ represents the average gain of the unvoiced packets, and β is a weight.

In step 1104, the voice information recoverer 544 sets the correction flag in the packet information storage 330. The correction flag is set when a lost packet is recovered using unvoiced information stored in the packet information storage 330.

As is apparent from the above description, the voice packet recovery apparatus and method according to embodiments of the present invention provide a voice service with less noise, suppressed buzz, and restricted abrupt big sounds to a voice packet receiver. Also, application of embodiments of the present invention to a relay leads to cost decreases.

While the present invention has been shown and described with reference to certain exemplary embodiments thereof, it will be understood by those skilled in the art that various changes in form and detail may be made therein without departing from the spirit and scope of the invention as defined by the appended claims.

What is claimed is:

1. An apparatus for recovering a lost voice packet, comprising:
   a packet loss detector for determining whether there is packet loss in a received packet;
   packet information storage for storing voice information of previous voice packets;
   a packet error corrector for measuring the information of the received packet, identifying a voiced packet and an unvoiced packet in the received packet, measuring voice information of the identified voiced packet comprising both unvoiced information and voiced information, storing the measured voice information in the packet information storage, correcting the voice information when necessary, and generating a corrected voice packet, when the received voice packet is normal; and
   a packet loss recoverer for recovering the voice information of the received voice packet using the voice information of previous voice packets stored in the packet information storage, and for recovering the unvoiced voice packet using a predetermined value, and generating a recovered packet, when there is packet loss in the received packet,
   wherein the packet information storage comprises:
   correction flag storage for storing a correction flag, the correction flag being set when a last recovered voice packet was recovered using unvoiced information;
   rate information storage for storing the data rate of a latest valid packet; and
   voice information storage for storing voice information of normal voice packets or the voice information of the recovered voice packet.

2. The apparatus of claim 1, wherein the packet error corrector comprises:
   a voice information extractor for extracting the voice information from the received voice packet, and measuring the data rate of the received voice packet;
   a voice information calculator for receiving the data rate and the voice information from the voice information extractor, calculating average voice information using the voice information, and storing the data rate, the voice information, and the average voice information in the packet information storage;
   a corrector for correcting the voice information received from the voice information calculator when necessary and storing the corrected voice information in the packet information storage; and
   a packetizer for generating the corrected voice packet using the voice information received from the corrector.

3. The apparatus of claim 2, wherein the corrector is configured to determine that the received normal packet needs correction, when the data rate of the received voice packet is low and the correction flag is set in the packet information storage.

4. The apparatus of claim 1, wherein the packet loss recoverer comprises:
   a rate decider for checking the data rate of the latest valid packet;
   a voice information recoverer for recovering the voice information of the received voice packet using the voice information of the previous voice packets according to the data rate of the latest valid packet, storing the recovered voice information in the packet information storage, and outputting the recovered voice information; and
   a packetizer for generating the recovered voice packet using the recovered voice information received from the voice information recoverer.

5. The apparatus of claim 4, wherein when the data rate of the latest valid packet is low, the recovered voice information includes a Line Spectrum Pair (LSP) and a gain.

6. The apparatus of claim 5, wherein the voice information recoverer is configured to recover the gain using equation, $$GAIN = (1-\beta) \cdot GAIN_{prev} + \beta \cdot GAIN_{avg}$$

wherein GAIN represents the recovered gain of the received voice packet, $GAIN_{prev}$ represents a gain of the latest unvoiced packet, $GAIN_{avg}$ represents an average gain of previous unvoiced packets, and β represents a weight.

7. The apparatus of claim 4, wherein when the data rate of the latest valid packet is high, the recovered information includes an LSP, a pitch, a pitch difference, an average Adaptive CodeBook (ACB) gain, an ACB gain, a Fixed CodeBook (FCB) gain, and an FCB index.

8. The apparatus of claim 7, wherein the voice information recoverer is configured to:
   when the number of contiguous lost voice packets is 2 or less, recover the pitch of the received voice packet by adding 1 to a pitch of a previous voice packet or subtracting 1 from the pitch of the previous voice packet; and
   when the number of contiguous lost voice packets is 3 or larger, recover the pitch of the received voice packet by adding 1 to the pitch of the previous voice packet.

9. The apparatus of claim 7, wherein the voice information recoverer is configured to recover the average ACB gain of the received voice packet by setting the average ACB gain of the received voice packet to an average ACB gain of a previous voice packet stored in the packet information storage, and when the recovered average ACB gain is larger than an ACB gain limit, change the recovered average ACB gain to the ACB gain limit.

10. The apparatus of claim 9, wherein the voice information recoverer is configured to compare the recovered average ACB gain with an ACB gain threshold and, when the recovered average ACB gain is less than or equal to the ACB gain threshold, set the FCB gain of the received packet to the predetermined value.

11. The apparatus of claim 10, wherein the predetermined value is one of zero and an empirical value.

12. The apparatus of claim 1, wherein the apparatus is provided at a relay in a voice packet communication system.

13. The apparatus of claim 12, wherein the relay comprises one of a gateway, a router, and a Base Station (BS).

14. A method for recovering a lost voice packet, comprising:
- receiving a packet and identifying a voiced packet and an unvoiced packet in the received packet, and measuring voice information of the identified voiced packets comprising both unvoiced information and voiced information;
- storing the measured voice information in a packet information storage;
- determining whether there is packet loss in the received packet; and
- recovering voice information of the received voice packet using measured voice information of previous voice packets, and recovering the unvoiced packet using a predetermined value, when there is packet loss in the received packet,
- wherein the packet information storage comprises:
- correction flag storage for storing a correction flag, the correction flag being set when a last recovered voice packet was recovered using unvoiced information;
- rate information storage for storing the data rate of a latest valid packet; and
- voice information storage for storing voice information of normal voice packets or the voice information of the recovered voice packet.

15. The method of claim 14, further comprising:
- generating a recovered voice packet using the recovered voice information; and
- sending the recovered voice packet.

16. The method of claim 14, wherein the voice information recovery comprises:
- checking a data rate of a latest valid packet; and
- recovering the voice information of the received packet using the voice information of the previous voice packets according to the data rate of the latest valid packet.

17. The method of claim 16, further comprising storing the recovered voice information.

18. The method of claim 16, wherein the voice information recovery according to the data rate of the latest valid packet comprises recovering a Line Spectrum Pair (LSP) and a gain as the voice information of the received packet, when the data rate of the latest valid packet is low.

19. The method of claim 18, wherein the gain information recovery comprises recovering the gain using equation, $$GAIN=(1-\beta)\cdot GAIN_{prev}+\beta\cdot GAIN_{avg}$$

wherein GAIN represents the recovered gain of the received voice packet, $GAIN_{prev}$ represents a gain of the latest unvoiced packet, $GAIN_{avg}$ represents an average gain of previous unvoiced packets, and $\beta$ represents a weight.

20. The method of claim 16, wherein the voice information recovery according to the data rate of the latest valid packet comprises recovering an LSP, a pitch, a pitch difference, an average Adaptive CodeBook (ACB) gain, an ACB gain, a Fixed CodeBook (FCB) gain, and an FCB index as the information of the received voice packet, when the data rate of the latest valid packet is high.

21. The method of claim 20, wherein the pitch recovery comprises:
- recovering the pitch of the received voice packet by adding 1 to a pitch of a previous voice packet or subtracting 1 from the pitch of the previous voice packet, when the number of contiguous lost voice packets is 2 or less; and
- recovering the pitch of the received voice packet by adding 1 to the pitch of the previous voice packet, when the number of contiguous lost voice packets is 3 or larger.

22. The method of claim 20, wherein the average ACB gain recovery comprises:
- recovering the average ACB gain of the received voice packet by setting the average ACB gain of the received voice packet to an average ACB gain of a previous voice packet; and
- changing the recovered average ACB gain to an ACB gain limit, when the recovered average ACB gain is larger than the ACB gain limit.

23. The method of claim 20, wherein the FCB gain recovery comprises:
- comparing the recovered average ACB gain with an ACB gain threshold; and
- setting the FCB gain of the received packet to the predetermined value, when the recovered average ACB gain is less than or equal to the ACB gain threshold.

24. The method of claim 23, wherein the predetermined value is one of zero and an empirical value.

25. The method of claim 14, further comprising
- measuring the data rate of the received voice packet, when the received voice packet is normal;
- extracting voice information of the received voice packet;
- determining whether the voice packet requires correction; and
- correcting the voice information when the voice packet requires correction.

26. The method of claim 25, further comprising:
- generating a corrected voice packet using the corrected voice information; and
- sending the corrected voice packet.

27. The method of claim 25, wherein the correction comprises setting an ACB gain of the voice packet to zero.

28. The method of claim 25, wherein the determination of whether the voice packet requires correction comprises determining that the received voice packet requires correction, when the data rate of the received packet is low and a previous received voice packet was recovered using unvoiced information.

29. The method of claim 25, further comprising storing the data rate, the voice information, and the corrected voice information.

30. The method of claim 15, wherein the method is performed at at least one of a relay and a receiver in a voice packet communication system.

31. The method of claim 30, wherein the relay comprises one of a gateway, a router, and a Base Station (BS).

* * * * *